(12) United States Patent
Lunghi et al.

(10) Patent No.: US 8,623,932 B2
(45) Date of Patent: Jan. 7, 2014

(54) FOAMED POLYOLEFIN COMPOSITION

(75) Inventors: Luca Lunghi, Ferrara (IT); Alessandro Medri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 220 days.

(21) Appl. No.: 13/131,201

(22) PCT Filed: Nov. 16, 2009

(86) PCT No.: PCT/EP2009/065195
§ 371 (c)(1),
(2), (4) Date: May 25, 2011

(87) PCT Pub. No.: WO2010/069687
PCT Pub. Date: Jun. 24, 2010

(65) Prior Publication Data
US 2011/0233449 A1   Sep. 29, 2011

Related U.S. Application Data

(60) Provisional application No. 61/204,662, filed on Jan. 9, 2009.

(30) Foreign Application Priority Data

Dec. 17, 2008   (EP) .................... 08171912

(51) Int. Cl.
| C08J 9/00 | (2006.01) |
| C08J 9/12 | (2006.01) |
| C08L 23/08 | (2006.01) |
| C08L 23/12 | (2006.01) |
| C08L 23/14 | (2006.01) |

(52) U.S. Cl.
USPC ............. 521/134; 521/50; 521/81; 521/82; 525/240; 525/242

(58) Field of Classification Search
USPC .................. 521/50, 81, 82, 134; 525/240
See application file for complete search history.

(56) References Cited

U.S. PATENT DOCUMENTS

| 4,399,054 A | 8/1983 | Ferraris |
| 5,145,819 A | 9/1992 | Winter |
| 5,324,800 A | 6/1994 | Welborn, Jr. |

FOREIGN PATENT DOCUMENTS

| EP | 45977 | 2/1982 |
| EP | 0129368 | 12/1984 |
| EP | 0416815 | 3/1991 |
| EP | 0420436 | 4/1991 |
| EP | 0485823 | 5/1992 |
| EP | 0579249 | 1/1994 |
| EP | 0643066 | 3/1995 |
| EP | 0671404 | 9/1995 |
| EP | 728769 | 8/1996 |
| EP | 782587 | 7/1997 |
| EP | 1801155 | 6/2007 |
| WO | WO-91/04257 | 4/1991 |
| WO | WO-2004/087805 | 10/2004 |
| WO | WO-2007003523 | 1/2007 |

*Primary Examiner* — Randy Gulakowski
*Assistant Examiner* — Kara Boyle

(57) ABSTRACT

A foamed polyolefin composition comprising (all percent amounts being by weight):
A) 50%-90% of a polypropylene component; and
B) 10%-50% of a copolymer component of ethylene and at least one $C_3$-$C_{10}$ α-olefin, the copolymer containing from 15% to 50% of ethylene, and optionally minor amounts of a diene;
the said amounts of (A) and (B) being referred to the total weight of (A) and (B); said composition having at least one of the following features i) and ii), or both:
i) a Polydispersity Index of component (A) of 4 or more;
ii) a value of viscosity [η] of the fraction soluble in xylene at room temperature equal to or higher than 3.5 dl/g.

6 Claims, No Drawings

FOAMED POLYOLEFIN COMPOSITION

This application is the U.S. national phase of International Application PCT/EP2009/065195, filed Nov. 16, 2009, claiming priority to European Application 08171912.2 filed Dec. 17, 2008 and the benefit under 35 U.S.C. 119(e) of U.S. Provisional Application No. 61/204,662, filed Jan. 9, 2009; the disclosures of International Application PCT/EP2009/065195, European Application 08171912.2 and U.S. Provisional Application No. 61/204,662, each as filed, are incorporated herein by reference.

The present invention relates to a foamed polyolefin composition having low density values, thus a high expansion degree and a substantive content of closed cells.

Foamed polyolefin compositions find use in many applications, like in particular packaging, thermal and acoustic insulation, wire and cable coatings and production of shock-absorbent elements (in car bumpers for example).

Polyolefin foams can be molded into the final shape while produced, as in the case of foamed sheets or pipes obtained directly from extrusion/foaming processes, or they can undergo multiple processing steps, as in the production of foamed beads, followed by sintering to obtain the final article.

Thus there is a continuous effort in the relevant art to provide foamed polyolefin compositions with high quality, in particular with very low density, which can be easily produced and processed.

In particular, it has been found that a very good balance of mechanical properties and processability can be obtained by foaming polyolefin compositions comprising a propylene polymer with broad molecular weight distribution and an olefin copolymer with elastomeric properties.

According to WO2007/003523, such kind of compositions require, in order to achieve good foamability, the presence of a polypropylene component with a very broad molecular weight distribution, namely with a Polydispersity Index higher than 15. In the examples a good foaming behavior is obtained by subjecting to foaming a composition containing a polypropylene component with a Polydispersity Index value of 30.3, and 18% by weight of an ethylene/propylene copolymer containing 66.6% by weight of ethylene.

It has now been found that particularly low values of density, in combination with attractive mechanical properties deriving from the presence of significant amounts of highly modified ethylene copolymers, can be achieved by foaming a polyolefin composition where a polypropylene component and an ethylene copolymer having a specific ethylene content are present in opportunely selected amounts.

Therefore, the present invention provides a foamed polyolefin composition comprising (all percent amounts being by weight):
A) 50%-90%, preferably 55-80%, more preferably 55-75% of a polypropylene component selected from the group consisting of a propylene homopolymer, a random copolymer of propylene containing up to 3% of ethylene, a random copolymer of propylene containing up to 6% of at least one $C_4$-$C_{10}$ α-olefin and optionally up to 3% of ethylene, and any combination thereof; and
B) 10%-50%, preferably 20-45%, more preferably 25-45% of a copolymer component of ethylene and at least one $C_3$-$C_{10}$ α-olefin, the copolymer containing from 15% to 50%, preferably from 20% to 48%, more preferably from 25% to 38% of ethylene, and optionally minor amounts of a diene;

the said amounts of (A) and (B) being referred to the total weight of (A) and (B); said composition having at least one of the following features i) and ii), or both:

i) a Polydispersity Index of component (A) of 4 or more;
ii) a value of viscosity [η] of the fraction soluble in xylene at room temperature (about 25° C.) equal to or higher than 3.5 dl/g.

In a preferred embodiment of the invention, the component (A) of the foamed polyolefin composition comprises (all percent amounts being by weight):
$A^I$) from 25% to 75%, preferably from 30% to 70%, of a propylene polymer having a melt flow rate $MFR^I$ of from 0.1 to 10 g/10 min., preferably from 0.1 to 5 g/10 min., more preferably from 0.1 to 3 g/10 min.; and
$A^{II}$) from 25% to 75%, preferably from 30% to 70%, of a propylene polymer having a melt flow rate value $MFR^{II}$ equal to or lower than 100 g/10 min., in particular from 5 to 100 g/10 min., preferably from 10 to 100 g/10 min., more preferably from 10 to 75 g/10 min.;

wherein the ratio $MFR^{II}/MFR^I$ (i.e. the value of the ratio of the MFR value of ($A^{II}$) to the MFR value of ($A^I$)) is from 5 to 60, preferably from 10 to 55, and the propylene polymers ($A^I$) and ($A^{II}$) are independently selected from the group consisting of a propylene homopolymer, a random copolymer of propylene containing up to 3% of ethylene, and a random copolymer of propylene containing up to 6% of at least one $C_4$-$C_{10}$ α-olefin and optionally up to 3% of ethylene; the said amounts of ($A^I$) and ($A^{II}$) being referred to the total weight of ($A^I$) and ($A^{II}$). The term "foamed" means that the polyolefin composition of the invention is obtained by subjecting to a conventional foaming process a polyolefin composition, hereinafter called polyolefin composition (I), having the same constituents and features as the final foamed product, namely comprising the above described components (A) and (B) and preferably ($A^I$) and ($A^{II}$) in the above said amounts, and having at least one of the above said features i) and ii).

As will be further explained, the foaming processes generally comprise a molten state treatment of polyolefin composition (I), like extrusion, in the presence of a foaming agent.

The MFR values are measured according to ASTM-D 1238, condition L (230° C., with 2.16 kg load).

The MFR of the polyolefin composition (I) and of the foamed polyolefin composition of the present invention can preferably range from 0.1 to 10 g/10 min., more preferably from 0.1 to 5 g/10 min.

Indicatively, the lower limit of ethylene and $C_4$-$C_{10}$ α-olefins in (A), ($A^I$) and/or ($A^{II}$) is of 0.1% by weight, preferably of 0.5% by weight in the case of $C_4$-$C_{10}$ α-olefins.

Illustrative $C_4$-$C_{10}$ α-olefins that can be present in (A), ($A^I$) and/or ($A^{II}$) include 1-butene, 1-pentene, 1-hexene, 4-methyl-1-pentene and 1-octene, with 1-butene being particularly preferred.

Preferably (A) and both ($A^I$) and ($A^{II}$) are propylene homopolymers.

Among the $C_3$-$C_{10}$ α-olefins that are present in the copolymer component (B), propylene is preferred. Other examples of the said α-olefins are the same as previously given for (A).

The diene when present, is typically in an amount of from 0.5 to 10% by weight with respect to the weight of (B). Examples of dienes are butadiene, 1,4-hexadiene, 1,5-hexadiene and ethylidene-norbornene-1.

Other preferred features for the polyolefin composition (I) and for the foamed polyolefin composition of the present invention are:
  intrinsic viscosity [η] of the fraction soluble in xylene at room temperature from 3.5 to 9 dl/g, more preferably from 4 to 8 dl/g;
  P.I. (Polydispersity Index) of (A) from 4 to 7;
  Isotacticity Index of (A) and both ($A^I$) and ($A^{II}$), determined as fraction insoluble in xylene at room temperature, of 90% or higher, more preferably, and in particular for propylene homopolymers, of 95% or higher, the upper limit being of 99%;

Mw/Mn values for (A) and both ($A^I$) and ($A^{II}$) higher than 4, more preferably higher than 4.5, in particular higher than 5 (measured by gel permeation chromathography in trichlorobenzene at 135° C.);

amount of fraction soluble in xylene at room temperature of the overall composition lower than 35% by weight.

The said polyolefin composition (I) can be prepared by a sequential polymerization, comprising at least two sequential steps, wherein components (A) and (B) are prepared in separate subsequent steps, operating in each step, except the first step, in the presence of the polymer formed and the catalyst used in the preceding step. The catalyst is added only in the first step, however its activity is such that it is still active for all the subsequent steps.

In particular, component (A) can require two sequential steps, one for preparing the fraction ($A^I$) and the other for preparing the fraction ($A^{II}$).

Preferably component (A) is prepared before component (B).

The order in which the fractions ($A^I$) and ($A^{II}$) are prepared is not critical.

The polymerization, which can be continuous or batch, is carried out following known techniques and operating in liquid phase, in the presence or not of inert diluent, or in gas phase, or by mixed liquid-gas techniques. It is preferable to carry out the polymerization in gas phase.

Reaction time, pressure and temperature relative to the polymerization steps are not critical, however it is best if the temperature is from 50 to 100° C. The pressure can be atmospheric or higher.

The regulation of the molecular weight is carried out by using known regulators, hydrogen in particular.

The composition can also be produced by a gas-phase polymerisation process carried out in at least two interconnected polymerisation zones. The said type of process is illustrated in European patent application 782 587.

The said polymerizations are preferably carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the polymerization process are capable of producing polypropylene with an isotactic index greater than 90%, preferably greater than 95%. Catalysts having the above mentioned characteristics are well known in the patent literature; particularly advantageous are the catalysts described in U.S. Pat. No. 4,399,054, EP-A-45977 and EP-A-728769.

Other catalysts that may be used in the polymerization process are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the component (B).

Examples of the said polymer composition (I) and of the process for preparing the same are described in WO2004/087805.

The foamed polyolefin composition of the present invention is flexible and soft. Said properties allow said foamed composition to be used in many applications, for example in the automotive sector, or other sectors such as in the manufacture of wheels for baby carriages, shock absorbing structures, wire and cable coatings etc.

The density of the foamed polyolefin composition of the invention preferably range from 20 to 300 kg/m$^3$, more preferably from 20 to 80 kg/m$^3$.

Density values up to 300 kg/m$^3$ are in particular obtained when relatively high amounts of other polymer components are present, and/or the foaming agents used are of chemical type (as further described).

Other polymer components that can be present in the foamed polyolefin composition of the invention are generally selected from conventional polymers of α-olefins containing from 2 to 10 carbon atoms.

Practical examples of the said polymers are:
1) crystalline propylene homopolymers, in particular isotactic or mainly isotactic homopolymers;
2) crystalline propylene copolymers with ethylene and/or a $C_4$-$C_{10}$ α-olefin, wherein the total comonomer content ranges from 0.05 to 20% by weight with respect to the weight of the copolymer, and wherein preferred α-olefins are 1-butene; 1-hexene; 4-methyl-1-pentene and 1-octene;
3) crystalline ethylene homopolymers and copolymers with propylene and/or a $C_4$-$C_{10}$ α-olefin, such as HDPE or LLDPE;
4) elastomeric copolymers of ethylene with propylene and/or a $C_4$-$C_{10}$ α-olefins, optionally containing minor quantities of a diene, such as butadiene, 1,4-hexadiene, 1,5-hexadiene and ethylidene-1-norbornene, wherein the diene content is typically from 1 to 10% by weight;
5) a thermoplastic elastomeric composition comprising one or more of propylene homopolymers and/or the copolymers of item 2) and an elastomeric moiety comprising one or more of the copolymers of item 4), typically prepared according to known methods by mixing the components in the molten state or by sequential polymerization, and generally containing the said elastomeric moiety in quantities from 5 to 80% by weight.

In general, the other polymer components can be present in amounts of 70% by weight or lower, preferably of 30% by weight or lower, with respect to the total weight of the foamed polyolefin composition.

In order to obtain the foamed polyolefin composition and foamed products of the present invention one can use processes and foaming agents commonly known in the art.

The foaming agents that can be used are both of the chemical and physical types. In the case of the former their decomposition temperature ranges from 100 to 220° C. ca.

The chemical foaming agents that are suitably used develop gas by way of thermal decomposition or chemical reactions. Examples of said foaming agents are: azodicarbonamides, sulfonylhydrazides, dinitropentamethylenetetramines, p-toluenesulfonyl semicarbazide, trihydrazine-triazine, barium azodicarboxilate, sodium borohydride, phenylsulfone, gypsum and alumina trihydrates, sodium bicarbonate or its compositions with citric acid, and generally speaking all the products used in the art for this purpose whose decomposition temperature is at least equal to the softening temperature of the polymer.

All the physical foaming agents known can be used, such as for example: light aliphatic hydrocarbons, optionally fluorinated and chlorinated, having a boiling point greater than 25° C., such as pentane, hexane, dichlorotrifluoroethanes, methylene chloride; or gas or liquid compounds having a boiling point lower than 25° C., such as air, nitrogen, carbon dioxide, chlorofluoromethane, dichlorodifrluoromethane, propane, butane, and isobutane.

In the processes for the preparation of foamed polyolefin composition one can use the extruders commonly used in the art, such as single-screw and twin-screw extruders.

The physical foaming agents are preferably injected or introduced in the molten polymer mass in the extruder at a distance from the point where the solid polymer is fed, where said polymer is found melted and homogeneous.

The chemical foaming agents can be mechanically blended with the solid polymer before the extrusion step. The dry blend thus obtained is then introduced in the first feeding area of the extruder, where the temperature ranges from 130 to 230° C. At the output of the extruder equipped with the appropriate die, for example a flat die or one with circular holes, one maintains the temperature that is most suitable for the foaming of the polymer. Said temperature preferably ranges from 125 to 200° C.

The following examples are given in order to illustrate and not limit the present invention.

The methods used to obtain the data relative to the properties reported in the examples and in the description are listed below.

Melt Flow Rate

Determined according to ASTM D-1238, condition L, namely at 230° C. with a load of 2.16 kg.

Intrinsic Viscosity

Determined in tetrahydronaphthalene at 135° C.

Density

Determined according to ISO 1183.

Polydispersity Index (P.I.)

Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I. = 10^5/Gc$$

in which Gc is the crossover modulus defined as the value (expressed in Pa) at which G'=G" wherein G' is the storage modulus and G" is the loss modulus.

Xylene Soluble and Insoluble Fractions 2.5 g of polymer and 250 cm$^3$ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm$^3$ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Polymer Components Used in the Examples

1) Heterophasic composition (I) comprising (weight percentages):
   A) 67% of a polypropylene component comprising:
      $A^I$) 50% of a propylene homopolymer having a melt flow rate $MFR^I$ of 1.5 g/10 min.; and
      $A^{II}$) 50% of a propylene homopolymer having a melt flow rate $MFR^{II}$ of 70 g/10 min.;
   B) 33% of a propylene/ethylene copolymer containing 38% of ethylene; said composition having a P.I. of (A) of 6.5 Isotacticity Index of (A) of 98%, a MFR of 0.8 g/10 min. and containing 29% of a fraction soluble in xylene at room temperature, having an intrinsic viscosity [η] of 7 dl/g.

The composition is obtained by way of sequential polymerization with the catalyst and the process described in Example 4 of WO2004/087805, with the necessary adjustments. In particular, the molar ratio of hydrogen to propylene in the polymerization stage where the homopolymer $A^{II}$) is prepared is of 0.16.

2) Heterophasic composition (II) having a MFR of 0.6 g/10 min., comprising (weight percentages):
   A) 32% of a crystalline propylene random copolymer containing 3.5% of ethylene and about 6% of a fraction soluble in xylene at room temperature, and having an intrinsic viscosity [η] of 1.5 dl/g;
   B) 68% of an ethylene/propylene copolymer containing 27% of ethylene, having solubility in xylene at room temperature of 89% by weight.

The intrinsic viscosity of the fraction soluble in xylene at room temperature of the total composition is of 3.2 dl/g.

The composition is obtained by way of sequential polymerization in the presence of a high-yield and highly stereospecific Ziegler-Natta catalyst supported on $MgCl_2$.

Example 1

The above described heterophasic composition (I) is subjected to foaming by extrusion with a Leistritz twin-screw Extruder Micro 27 having a screw diameter of 27 mm and a screw length of 1080 mm, fed by a gravimetric working feeder.

To obtain the foam, $CO_2$ is dosed with a Maximator GSD 500 feeder.

The extrusion is carried out under the following conditions.
Extruder temperatures: 220° C. in the first two zones, 160-180° C. in the subsequent zones;
Die temperature: 155° C.;
$CO_2$ amount: 0.1 g/second; 9% by weight;
$CO_2$ pressure: 11 MPa;
Extruder throughput: 4 kg/hour;
Screw rotation speed: 75 rpm;
Polymer bulk temperature: 170° C.;
Polymer Bulk pressure: 26.8 MPa.

A foamed composition in form of strand is so obtained.
The density of such foamed composition is of 33 kg/m$^3$.

Example 2

A blend of 50% by weight of the heterophasic composition (I) and 50% by weight of the heterophasic composition (II) is prepared by way of a conventional process of extrusion in the molten state.

Such blend is foamed with $CO_2$ using the same apparatus as in Example 1 and operating under the following conditions.

Extruder temperatures: 220° C. in the first two zones, 170-180° C. in the subsequent zones;
Die temperature: 165° C.;
$CO_2$ amount: 0.1 g/second; 9% by weight;
$CO_2$ pressure: 10.2 MPa;
Extruder throughput: 4 kg/hour;
Screw rotation speed: 75 rpm;
Polymer bulk temperature: 177° C.;
Polymer Bulk pressure: 26 MPa.

A foamed composition in form of strand is so obtained. The density of such foamed composition is of 179 kg/m³.

The invention claimed is:

1. An article comprising:
    a foamed polyolefin composition comprising (all percent amounts being by weight):
    (A) 50%-90% of a polypropylene component comprising:
        ($A^I$) from 25% to 75% by weight, based upon the total weight of (A), of a propylene polymer having a melt flow rate $MFR^I$ of from 0.1 to 10 g/10 min.; and
        ($A^{II}$) from 25% to 75% by weight, based upon the total weight of (A), of a propylene polymer having a melt flow rate value $MFR^{II}$ of at most 100 g/10 min.;
        wherein the ratio $MFR^{II}/MFR^I$ is from 5 to 60 and the propylene polymers ($A^I$) and ($A^{II}$) are independently selected from the group consisting of a propylene homopolymer, a random copolymer of propylene containing up to 3% of ethylene, and a random copolymer of propylene containing up to 6% of at least one $C_4$-$C_{10}$ α-olefin and optionally up to 3% of ethylene; the amounts of ($A^I$) and ($A^{II}$) being referred to the total weight of ($A^I$) and ($A^{II}$) wherein (A) has a polydispersity index from 4 to 7; and
    (B) 10%-50% of a copolymer component of ethylene and at least one $C_3$-$C_{10}$ α-olefin, the copolymer containing from 15% to 50% of ethylene, and
    (C) optionally 0.5 to 10 weight %, based upon the weight of (B), of a diene;
    the amounts of (A) and (B) being referred to the total weight of (A) and (B); said composition having
    a value of viscosity [η] of the fraction soluble in xylene at room temperature of 3.5 to 9 dl/g.

2. The article of claim 1, wherein the foamed polyolefin has an MFR value of from 0.1 to 10 g/10 min.

3. The article of claim 1, wherein the foamed polyolefin has a density from 20 to 300 kg/m³.

4. The article of claim 1, wherein the article is a wire and/or a cable coating.

5. The article of claim 1, wherein the article is a shock-absorbent element.

6. The article of claim 1, wherein the article is a thermal insulation or an acoustic insulation.

* * * * *